(12) United States Patent
Salammagari et al.

(10) Patent No.: US 11,328,175 B2
(45) Date of Patent: May 10, 2022

(54) METHOD AND APPARATUS FOR FACILITATING TRAINING OF AGENTS

(71) Applicant: [24]7.ai, Inc., San Jose, CA (US)

(72) Inventors: Abhi Ram Reddy Salammagari, San Jose, CA (US); Abhishek Ghose, Mountain View, CA (US); Anand Madhavan, San Jose, CA (US); Suneet Grover, San Jose, CA (US)

(73) Assignee: [24]7.ai, Inc., San Jose, CA (US)

( * ) Notice: Subject to any disclaimer, the term of this patent is extended or adjusted under 35 U.S.C. 154(b) by 175 days.

(21) Appl. No.: 16/567,104

(22) Filed: Sep. 11, 2019

(65) Prior Publication Data

US 2020/0082214 A1 Mar. 12, 2020

Related U.S. Application Data

(60) Provisional application No. 62/730,396, filed on Sep. 12, 2018.

(51) Int. Cl.
| | |
|---|---|
| *G06K 9/62* | (2006.01) |
| *H04L 51/02* | (2022.01) |
| *G10L 15/08* | (2006.01) |
| *G06N 5/02* | (2006.01) |
| *G06F 40/10* | (2020.01) |

(52) U.S. Cl.
CPC .......... *G06K 9/6218* (2013.01); *G06F 40/10* (2020.01); *G06K 9/6269* (2013.01); *G06N 5/025* (2013.01); *G10L 15/083* (2013.01); *H04L 51/02* (2013.01)

(58) Field of Classification Search
CPC .... G06K 9/6218; G06K 9/6269; G06F 40/10; G06F 40/30; H04L 51/02; H04L 51/04; G10L 15/083; G10L 15/1822; G06N 5/025; G06N 3/088; G06N 3/006; G06N 5/043
See application file for complete search history.

(56) References Cited

U.S. PATENT DOCUMENTS

| | | | |
|---|---|---|---|
| 10,503,834 B2* | 12/2019 | Bachrach | G06F 40/284 |
| 2011/0238408 A1* | 9/2011 | Larcheveque | G06F 40/284 704/9 |
| 2014/0288932 A1 | 9/2014 | Yeracaris et al. | |
| 2015/0066479 A1 | 3/2015 | Pasupalak et al. | |
| 2015/0149182 A1 | 5/2015 | Kalns et al. | |
| 2015/0189086 A1 | 7/2015 | Romano et al. | |

(Continued)

*Primary Examiner* — Christopher M Brandt
(74) *Attorney, Agent, or Firm* — Perkins Coie LLP; Michael Glenn; Louis Yang

(57) ABSTRACT

A method and apparatus for facilitating training of agents is disclosed. Raw transcripts representing textual form of interactions between the agents and customers of the enterprise are transformed to generate transformed transcripts. An interaction summary is generated in relation to each transformed transcript. A plurality of intent-based interaction clusters are derived using the interaction summary generated in relation to each transformed transcript. The plurality of interactions are classified based on the plurality of intent-based interaction clusters and an interaction flow map is generated for each intent-based interaction cluster based on the interactions classified into the respective intent-based interaction cluster. The generated interaction flow map is capable of facilitating training of agents for interacting with the customers of the enterprise.

15 Claims, 9 Drawing Sheets

(56) References Cited

U.S. PATENT DOCUMENTS

| | | | |
|---|---|---|---|
| 2017/0018269 A1* | 1/2017 | Lev | G06F 40/289 |
| 2017/0069310 A1* | 3/2017 | Hakkani-Tur | G06F 40/35 |
| 2019/0182382 A1* | 6/2019 | Mazza | G10L 15/26 |

* cited by examiner

```
302
AGENT: THANK YOU FOR CONTACTING US,
       HOW CAN I HELP YOU, TODAY?
JOHN:  HI, I BOUGHT A NEW CAR YESTERDAY
       AND I WOULD LIKE TO TRANSFER MY
       ACCOUNT TO A NEW VEHICLE.
AGENT: CONGRATULATIONS ON YOUR NEW
       VEHICLE!
AGENT: YES, YOU CAN TRANSFER THE
       SERVICES FROM YOUR OLD VEHICLE
       TO THE NEW VEHICLE.
AGENT: WE HAVE A SPECIAL TEAM THAT
       WILL HELP YOU WITH THAT. LET ME
       GIVE YOU THEIR TELEPHONE NUMBER.
AGENT: PLEASE CALL 0123456789 AND THAT
       SPECIAL DEPARTMENT WILL HANDLE
       THAT ENTIRE TRANSACTION FOR YOU.
JOHN:  THANKS
```

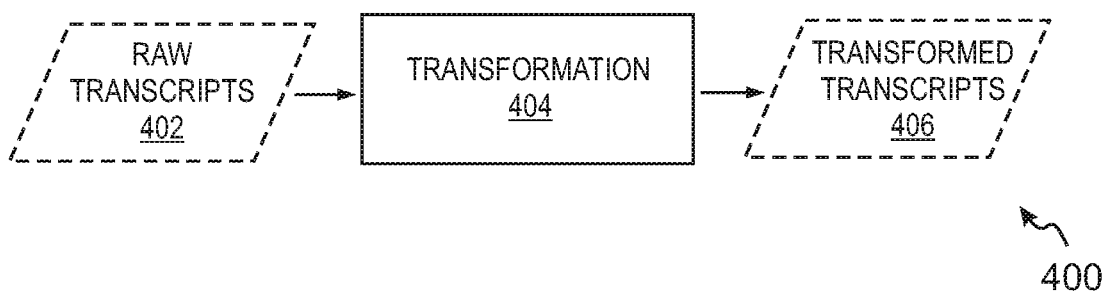

METHOD AND APPARATUS FOR FACILITATING TRAINING OF AGENTS

CROSS REFERENCE TO RELATED APPLICATIONS

This application claims priority to U.S. provisional patent application Ser. No. 62/730,396 filed Sep. 12, 2018, which is incorporated herein in its entirety by this reference thereto.

TECHNICAL FIELD

The present technology generally relates to interactions between customers and agents of an enterprise and, more particularly, to a method and apparatus for facilitating training of agents for interacting with customers of the enterprise.

BACKGROUND

Typically, a customer may wish to interact with a customer support representative of an enterprise to enquire about products/services of interest, to resolve concerns, to make payments, to lodge complaints, and the like. To serve such a purpose, the enterprises may deploy both, human and automated conversational agents to interact with the customers and provide them with desired assistance.

A typical interaction, such as an online chat interaction, between a customer and an agent may involve several turns, i.e. the customer and the agent may take turns in interacting with each other. Further, every turn-based interaction between an agent and a customer is associated with an interaction flow, or more specifically, a logical sequence of utterances exchanged between the agent and the customer. Generally, the interaction flows may differ from one interaction to another. For example, a flow of an interaction between a customer and an agent for resolving a billing issue may be different from a flow of another interaction, where the agent provides assistance to a customer in purchasing a product on a website. Moreover, in many cases, even the flows of interactions involving resolution of similar customer concerns may be different from one another.

To provide effective assistance to the customers and improve a quality of customer interaction experience, the agents must be trained to handle various interaction flows. To that effect, solution designers manually map out interaction flows, where each map is designed to cover one customer intent with a set of scenarios. A simple intent implies a simpler flow design, but it also necessitates maintaining multiple interaction flows with subtle differences. On the other hand, a complex intent with many scenarios requires more time to generate the interaction flow. As a result, determining the right complexity for a set of intents may involve several iterations. The manual generation of maps of interaction flows is, thus, slow and involves cumbersome effort on part of the solution designers. In addition to being slow and laborious, the manual generation of maps is also prone to errors. Further, such a manual output is also not suited for training of agents, especially automated chat agents or chat bots, and requires time consuming modifications. Furthermore, any modifications or changes to the interaction flow delay the deployment of the chat bots in the field for engaging with actual customers.

For aforementioned reasons, there is a need for automatically generating interaction flow maps to preclude cumbersome manual effort on behalf of the solution designers. Further, there is a need to facilitate training of agents, especially automated conversational agents or chat bots, using the interaction flow maps to enable the agents to engage with customers and provide them with desired assistance.

SUMMARY

In one embodiment, a computer-implemented method for facilitating training of agents of an enterprise is disclosed. The method transforms, by a processor, a plurality of raw transcripts to generate transformed transcripts. The plurality of raw transcripts represents textual form of a plurality of interactions between the agents and customers of the enterprise. The transformation of each raw transcript from among the plurality of raw transcripts includes performing at least one pre-processing operation on the respective raw transcript. The method generates, by the processor, an interaction summary in relation to each transformed transcript. The method derives, by the processor, a plurality of intent-based interaction clusters using the interaction summary generated in relation to each transformed transcript. Each intent-based interaction cluster is associated with a customer intent to configure a plurality of customer intents corresponding to the plurality of intent-based interaction clusters. The method classifies interactions from among the plurality of interactions, by the processor, based on the plurality of intent-based interaction clusters. The method generates, by the processor, an interaction flow map for each intent-based interaction cluster based on the interactions classified into the respective intent-based interaction cluster. The generated interaction flow map is capable of facilitating training of at least one agent for interacting with the customers of the enterprise.

In another embodiment, an apparatus for facilitating training of agents of an enterprise is disclosed. The apparatus includes a processor and a memory. The memory stores instructions. The processor is configured to execute the instructions and thereby cause the apparatus to transform a plurality of raw transcripts to generate transformed transcripts. The plurality of raw transcripts represents textual form of a plurality of interactions between agents and customers of the enterprise. The transformation of each raw transcript from among the plurality of raw transcripts includes performing at least one pre-processing operation on the respective raw transcript. The apparatus generates an interaction summary in relation to each transformed transcript. The apparatus derives a plurality of intent-based interaction clusters using the interaction summary generated in relation to each transformed transcript. Each intent-based interaction cluster is associated with a customer intent to configure a plurality of customer intents corresponding to the plurality of intent-based interaction clusters. The apparatus classifies interactions from among the plurality of interactions based on the plurality of intent-based interaction clusters. The apparatus generates an interaction flow map for each intent-based interaction cluster based on the interactions classified into the respective intent-based interaction cluster. The generated interaction flow map is capable of facilitating training of at least one agent for interacting with the customers of the enterprise.

In yet another embodiment, a computer-implemented method for facilitating training of chatbots of an enterprise is disclosed. The method classifies, by a processor, a plurality of interactions between the agents and customers of the enterprise based on a plurality of intent-based interaction clusters. The method performs, by the processor, for at least one intent-based interaction cluster from among the plurality of intent-based interaction clusters: (1) retrieve agent utterances and customer utterances from the interactions classified into the intent-based interaction cluster; (2) cluster the agent utterances at each agent turn and cluster the customer utterances at each customer turn to generate one or more agent utterance clusters for each agent turn and one or more customer utterance clusters for each customer turn, respectively; and (3) trace the flow of interaction from one interaction turn to another interaction turn using interaction paths for each interaction classified into the intent-based interaction cluster. Each interaction path is capable of connecting an utterance cluster at one turn to another utterance cluster at a subsequent turn. Tracing the flow of interaction for each interaction facilitates the generation of an interaction flow map for the respective intent-based interaction cluster. The interaction flow map is capable of facilitating training of at least one chatbot for interacting with the customers of the enterprise.

BRIEF DESCRIPTION OF THE FIGURES

FIG. 3 shows a representation of a portion of a raw transcript corresponding to a textual chat interaction between a customer and an agent, in accordance with an embodiment of the invention;

FIG. 4A shows a representation illustrating generation of transformed transcripts from a plurality of raw transcripts, in accordance with an embodiment of the invention;

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
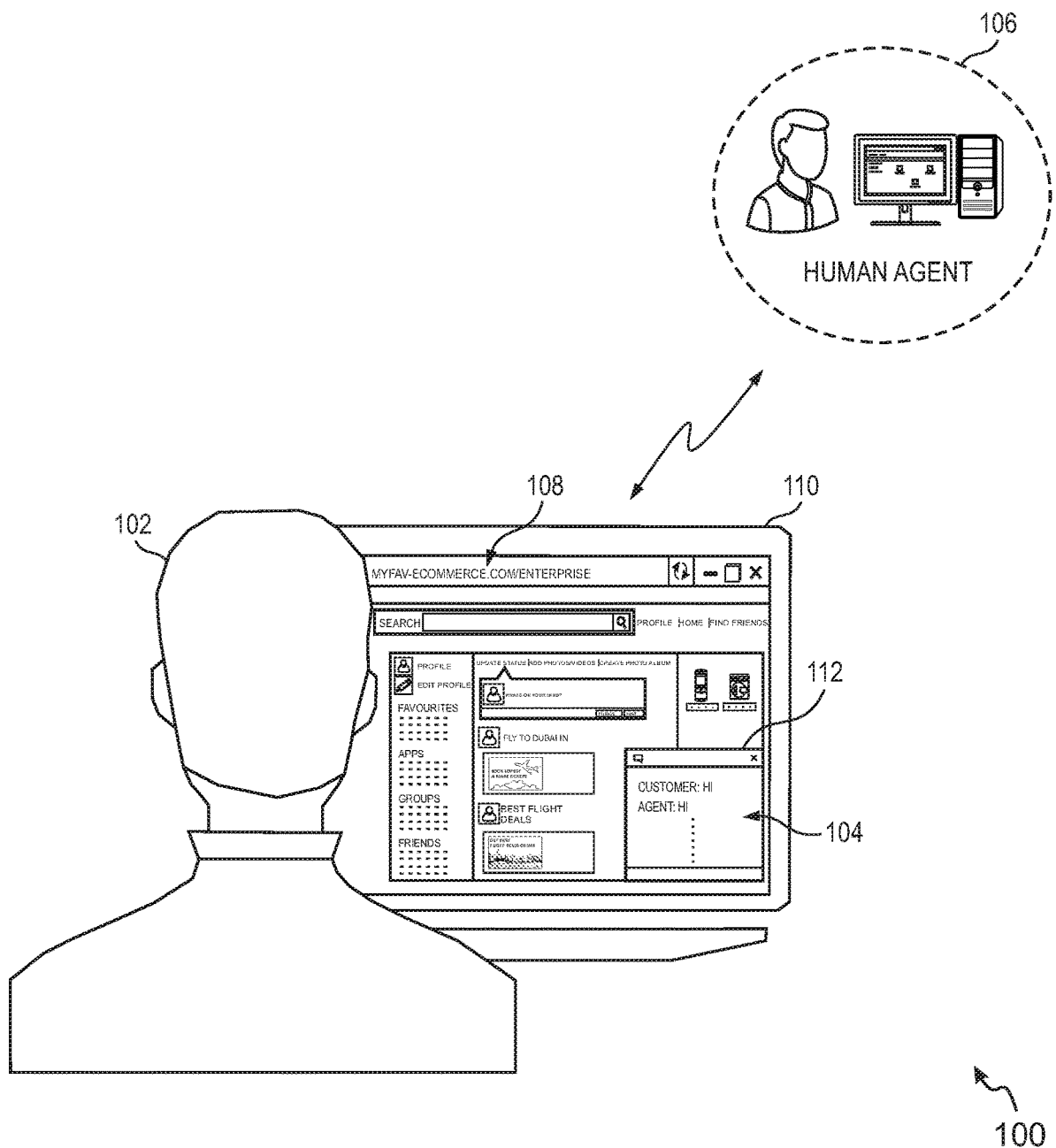
FIG. 1 shows a representation of a customer engaged in a chat interaction with a human agent of an enterprise, in accordance with an example scenario.

FIG. 1 shows a representation 100 of a customer 102 engaged in a chat interaction 104 with a human agent 106 of an enterprise, in accordance with an example scenario. The term 'enterprise' as used throughout the description may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. It is understood that the enterprise may be associated with potential and existing users of products, services and/or information offered by the enterprise. Such existing or potential users of enterprise offerings are referred to herein as customers of the enterprise. The representation 100 depicts one example customer of an enterprise as the customer 102 for illustration purposes.

Most enterprises, nowadays, extend dedicated customer support facility to their customers. A typical customer support center may include a number of customer service representatives, such as human agents, chat bots and self-assist systems, such as either Web or mobile digital self-service, and/or Interactive Voice Response (IVR) systems. The customer support representatives are trained to interact with the customers for providing information to the customers, selling to them, answering their queries, addressing their concerns, and/or resolving their issues. It is noted that automated conversational agents are also referred to herein as 'virtual agents' or chatbots' or simply as 'bots'. For purposes of the description, the human agents and the bots are collectively referred to as 'agents'. The representation 100 depicts one example human agent associated with the enterprise as the human agent 106.

In an illustrative scenario, the customer 102 may access a website 108 using a Web browser application installed on a personal electronic device 110, which is exemplarily depicted to be a desktop computer. It is noted that the personal electronic device 110 of the customer 102 is depicted to be the desktop computer for illustration purposes and that the personal electronic device 110 may not be limited to a desktop computer and may include any electronic device capable of connecting to a communication network such as the Internet. Some non-exhaustive examples of the personal electronic device 110 include, but are not limited to, a smartphone, a tablet, a laptop, a personal digital assistant (PDA), a wearable device, etc. Similarly, an electronic device associated with the human agent 106 may also be embodied as any of the devices mentioned above.

The website 108 serves as a Web interaction channel provided by the enterprise for selling goods, services and enterprise information to customers such as the customer 102. The website 108 may be hosted on a remote Web server (not shown in FIG. 1) and a Web browser application installed in the personal electronic device 110 may be configured to retrieve one or more Web pages associated with the website 108 from the remote Web server over the communication network. It is understood that the website 108 may attract a large number of existing and potential customers, such as the customer 102.

In the representation 100, the website 108 is exemplarily depicted to be an Electronic Commerce (E-commerce) website displaying a variety of products and services for sale to online visitors during their journey on the website 108. It is noted that the term 'journey' as used throughout the description refers to a path, a customer such as the customer 102 may take to reach a conclusion when using an enterprise interaction channel, such as a website or an Interactive Voice Response (IVR) channel. For example, a Web journey of the customer 102 on the website 108 may include navigating through several Web pages and decision points that carry the online interaction on the website 108 from one step to another step.

In an example scenario, the activity of the customer 102 on the website 108 may be tracked and an intention of the customer 102 to perform a desired action, such as complete a purchase transaction on the website 108 or click on a banner advertisement may be determined. If it is determined that the customer 102 will perform the desired action, then an appropriate treatment such as an offer to chat with an agent of an enterprise or an offer to speak with a customer support representative like the human agent 106 or an automated conversational agent may be selected and provided to the customer 102. In an illustrative example, a widget displaying text 'NEED ASSISTANCE, TALK TO OUR AGENT!!' may be displayed on the current UI of the website 108. A selection input on the widget by the customer 102 may cause a chat console, such as a chat console 112 to pop up, for facilitating the chat interaction 104 between the customer 102 and the human agent 106.

It is noted that in some example scenarios, the customer 102 may also call a customer care number displayed on the website 108 and connect with a conversational agent (such as the human agent 106 or an IVR system) to seek assistance from the conversational agent. It is understood that the interaction may be embodied as voice conversation in such a scenario.

Each interaction between an agent and a customer (such as the human agent 106 and the customer 102) is associated with an interaction flow, i.e. a logical sequence of utterances exchanged between the agent and the customer. Generally, an interaction flow is different for interactions involving different customer intents. To provide effective assistance to the customers and improve a quality of customer interaction experience, the agents must be trained to handle various interaction flows. To that effect, solution designers manually trace interaction-turns in a plurality of interactions to generate interaction flow maps. Generally, each interaction flow map is designed to cover one customer intent with a set of scenarios. The manual generation of maps is slow, laborious and prone to errors. Further, the manually generated maps are also not suited for training of agents, especially automated chat agents or chat bots, and require time consuming modifications.

Various embodiments of the present invention provide a method and apparatus that are capable of overcoming these and other obstacles and providing additional benefits. More specifically, various embodiments of the present invention disclose a method and apparatus for facilitating training of agents of an enterprise. The method includes automatic discovery of customer intents from the interaction transcripts. The method further includes automatic generation of interaction flow maps based on the discovered intents. As the interaction flow maps are generated in an automated manner, the slow and cumbersome manual mapping of interaction flows is avoided. Further, the automatically generated interaction flow maps are used to train machine learning models, which are then used to train bots for interacting with the customers of the enterprise. As the conversational flows are mapped by processing a plurality of conversational transcripts, the maps of the conversational flows are fairly comprehensive and accurate, and as such, the bots trained using such conversational flow maps may be deployed immediately after the model training is completed, thereby expediting the field deployment of bots.

An apparatus configured to facilitate training of agents of an enterprise is explained next with reference to FIG. 2.

Figure 2:
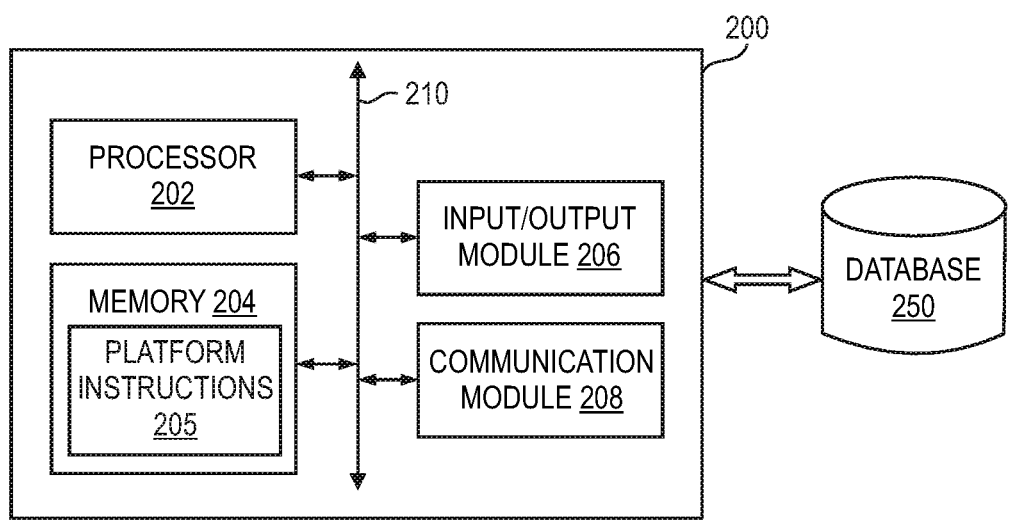
FIG. 2 is a block diagram of an apparatus configured to facilitate training of agents of an enterprise, in accordance with an embodiment of the invention.

FIG. 2 is a block diagram of an apparatus 200 configured to facilitate training of agents of an enterprise, in accordance with an embodiment of the invention. It is noted that the term 'customers' as used herein includes both existing customers as well as potential customers of information, products and services offered by the enterprise. Moreover, the term 'customer' of the enterprise may include individuals, groups of individuals, other organizational entities etc. The term 'enterprise' as explained with reference to FIG. 1 may refer to any public and/or private sector enterprise.

In one embodiment, the apparatus 200 is embodied as an interaction platform with one or more components of the apparatus 200 implemented as a set of software layers on top of existing hardware systems. The interaction platform is configured to engage in bi-directional communication with enterprise interaction channels and/or data gathering Web servers linked to the enterprise interaction channels over a communication network. The communication network may be embodied as a wired communication network (for example, Ethernet, local area network (LAN), etc.), a wireless communication network (for example, a cellular network, a wireless LAN, etc.) or a combination thereof (for example, the Internet). In an illustrative example, the interaction platform may communicate over the communication network with a data gathering server deployed at customer service/support facility to receive information related to agent-customer interactions in an on-going manner in substantially real-time. In another illustrative example, the interaction platform may be in operative communication with servers associated with enterprise interaction channels, such as a server hosting an enterprise website to receive information related to customer activity on the website in substantially real-time.

The apparatus 200 includes at least one processor, such as a processor 202 and a memory 204. It is noted that although the apparatus 200 is depicted to include only one processor, the apparatus 200 may include more number of processors therein. In one embodiment, the memory 204 is capable of storing machine executable instructions, referred to herein as platform instructions 205. Further, the processor 202 is capable of executing the platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the memory 204 is configured to store logic and instructions for processing of transcripts of interactions between agents and customers to facilitate training of agents. It is noted that the term 'interactions' as used throughout the description refers to conversations, whether conducted in a voice form or a textual chat form, between agents and customers of the enterprise. It is noted that the interactions conducted using the voice medium may be converted to a textual form to configure corresponding transcripts, whereas the textual content of the interactions conducted using the chat medium may directly be treated as transcripts for the corresponding interactions. For facilitating conversion of voice interactions to a textual form, the memory 204 may store instructions/logic for automatic speech recognition (ASR) and Natural Language Processing (NLP) techniques using special grammar. In an illustrative example, a voice interaction between a human agent and a customer may be converted to a textual form using instructions/logic related to ASR and NLP with special grammar.

The memory 204 also stores one or more intent prediction models, which are configured to predict intent(s) of each customer for requesting an interaction with the agent. The memory 204 further stores at least one clustering algorithm from among X-means or K-means algorithm, a Self-Organizing Map (SOM) based algorithm, a Self-Organizing Feature Map (SOFM) based algorithm, a density-based spatial clustering algorithm, an optics clustering based algorithm and the like, for facilitating clustering of interactions and utterances as will be explained in further detail later.

The apparatus 200 is depicted to be in operative communication with a database 250. The database 250 is any computer-operated hardware suitable for storing and/or retrieving data, such as, but not limited to, a registry of human agents, a registry of standard and specialized virtual agents, digital content capable of being displayed on the enterprise interaction channels, such as for example information snippets, banner advertisements and widgets offering agent support among other content related to promotional offers, discount coupons etc.

In at least one embodiment, the database 250 is configured to store raw data related to interactions between the agents and the customers. The database 250 may also store transcripts corresponding to the stored interactions. Further, the database 250 may store interaction flow maps generated from processing of the raw transcripts.

The database 250 may include multiple storage units such as hard disks and/or solid-state disks in a redundant array of inexpensive disks (RAID) configuration. The database 250 may include a storage area network (SAN) and/or a network attached storage (NAS) system. The database 250 may be accessed by the apparatus 200 using a storage interface (not shown in FIG. 2). The storage interface is any component capable of providing the processor 202 with access to the database 250. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the database 250. Though, the database 250 is depicted to be located external to the apparatus 200, in some embodiments, the database 250 is integrated within the apparatus 200. For example, the apparatus 200 may include one or more hard disk drives as the database 250.

The apparatus 200 also includes an input/output module 206 (hereinafter referred to as an 'I/O module 206') and at least one communication module such as a communication module 208. The I/O module 206 includes mechanisms configured to receive inputs from and provide outputs to the user of the apparatus 200. The term 'user of the apparatus 200' as used herein refers to any individual or groups of individuals assigned with operating the apparatus 200 for facilitating training of agents. In an illustrative example, an enterprise may employ several data scientists, Machine Learning (ML) and/or Artificial Intelligence (AI) analysts, Information Technology (IT) professionals, scientists and researchers for configuring and operating the apparatus 200 embodied as an interaction platform. In an illustrative example, the I/O module 206 may enable the user of the apparatus 200 to define various processing stages for generating interaction flow maps. In another illustrative example, the I/O module 206 may enable the user of the apparatus 200 to feed/input information related to agents, such as agent domain specialization for instance, to enable routing of interaction requests from customers to appropriate agents within a customer support facility, such as for example bots trained using interaction flow maps. To provide such inputs and view corresponding outputs, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication module 208 is configured to facilitate communication between the apparatus 200 and one or more remote entities over a communication network, such as the communication network explained above. For example, the communication module 208 may enable communication between the apparatus 200 and one or more customer support facilities. In an illustrative example, the communication module 208 receives information related to voice or chat interactions between customers and agents being conducted using various interaction channels, in real-time and provides the information to the processor 202. To that effect, the communication module 208 may include several channel interfaces to receive information from a plurality of enterprise interaction channels. In at least some embodiments, the communication module 208 may include relevant Application Programming Interfaces (APIs) to communicate with remote data gathering servers associated with such enterprise interaction channels over the communication network. Each channel interface may further be associated with a respective communication circuitry such as for example, a transceiver circuitry including antenna and other communication media interfaces to connect to the communication network. The communication circuitry associated with each channel interface may, in at least some example embodiments, enable transmission of data signals and/or reception of signals from remote network entities, such as Web servers hosting enterprise Website or a server at a customer support facility configured to maintain real-time information related to conversations between customers and conversational agents.

In some embodiments, the information may also be collated from the plurality of devices utilized by the customers. To that effect, the communication module 208 may be in operative communication with various customer touch points, such as electronic devices associated with the customers, Websites visited by the customers, devices used by customer support representatives (for example, voice agents, chat agents, IVR systems, in-store agents, and the like) engaged by the customers, and the like.

In an embodiment, various components of the apparatus 200, such as the processor 202, the memory 204, the I/O module 206 and the communication module 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

It is noted that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. In an embodiment, one or more components of the apparatus 200 may be deployed in a Web Server. In another embodiment, the apparatus 200 may be a standalone component in a remote machine connected to a communication network and capable of executing a set of instructions (sequential and/or otherwise) to facilitate training of agents, such as chatbots, using the interaction flow maps. In one embodiment, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as customer's devices. In another embodiment, the apparatus 200 may be a central system that is shared by or accessible to each of such devices.

In at least one example embodiment, the processor 202 in conjunction with the instructions in the memory 204, is configured to cause the apparatus 200 to receive a plurality of interactions between agents and customers of an enterprise. As explained above, the communication module 208 of the apparatus 200 is in operative communication with a plurality of Web gathering servers. The communication module 208 receives the information related to agent interactions with the customers from a server deployed at the customer support center. It is noted that the plurality of interactions includes voice interactions and textual chat interactions between the agents and the customers of the enterprise. The plurality of interactions (whether in textual form or in audio form) are stored in the database 250 associated with the apparatus 200. The processor 202 in conjunction with the logic/instructions stored in the memory 204 is configured to generate textual representations of the voice interactions using natural language processing (NLP) and automatic speech recognition (ASR). More specifically, the processor 202 is configured to convert the non-textual conversations into a textual form using NLP and ASR with special grammar. The chat interactions, which are already in textual form, as well as the textual representations of voice interactions (i.e. transcripts of voice interactions) together configure a corpus of raw transcripts, also referred to herein as a plurality of raw transcripts. The plurality of raw transcripts are then processed to facilitate training of agents as will be explained in further detail later. An example raw transcript associated with an interaction between a customer and an agent in depicted in FIG. 3.

Referring now to FIG. 3, a representation of a portion of a raw transcript 300 corresponding to a textual chat interaction 302 between a customer and an agent is shown, in accordance with an embodiment of the invention. As explained with reference to FIGS. 1 and 2, the customers may seek interaction with the agents for various reasons. In an example scenario, a customer 'John' may initiate the chat interaction 302 with an agent to seek assistance for transferring a car radio service from one vehicle to another. The textual content corresponding to the chat interaction 302 configures the raw transcript 300 and a portion of such a raw transcript is depicted in FIG. 3. The utterances of the customer John are depicted to be labeled using a tag 'JOHN', whereas the utterances of the agent are exemplarily depicted to be labeled with a tag 'AGENT'. It is noted that the term 'utterance' as used herein implies conversational words or lines typed or spoken by an individual (whether the customer or the agent) in a single turn of a turn-based interaction. The textual content of the chat interaction 302 serves as one of the raw transcripts for use in generating interaction flow maps as will be explained hereinafter.

In at least one example embodiment, the processor 202 in conjunction with the instructions in the memory 204, is configured to cause the apparatus 200 to transform a plurality of raw transcripts to generate 'transformed transcripts'. The transformation of the raw transcripts is explained with reference to FIGS. 4A and 4B.

Figure 4B:
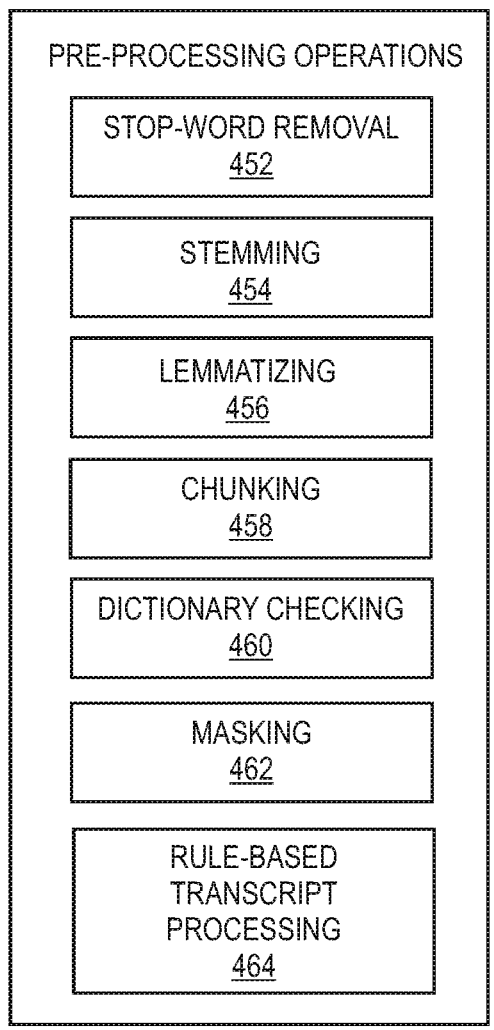
FIG. 4B shows a block diagram for illustrating pre-processing operations performed on transcripts converted into consumable form, in accordance with an embodiment of the invention.

Referring now to FIG. 4A, a representation 400 illustrating generation of transformed transcripts from a plurality of raw transcripts is shown, in accordance with an embodiment of the invention. More specifically, the representation 400 depicts an input 402 of a plurality of raw transcripts, such as the raw transcript 300 explained with reference to FIG. 3, provided to a block 404 associated with text 'TRANSFORMATION'. The block 404 is configured to embody the transformation related processing performed by the processor 202 of the apparatus 200 shown in FIG. 2. It is noted that raw transcripts stored in the database 250 associated with the apparatus 200 (shown in FIG. 2) may be fetched from the database 250 and provided as the input 402 to the processor 202 for transforming the raw transcripts. The term 'transformation' as used herein implies conversion of the raw transcripts to a predefined format. More specifically, the raw transcripts may be converted into consumable form, such as for example, into a comma separated value (.csv) file format. The transformed csv file may include a chat id (or a conversation id), a turn sequence (i.e. a sequence number of the turn), a turn from (i.e. binary representation indicative of whether the turn is from the customer or the agent) and a body (i.e. text uttered by customer/agent in each turn). All the turns are grouped and sorted based on chat id. The result of the transformation of the raw transcripts is depicted as an output 406 in the representation 400. More specifically, the output 406 corresponds to the transformed transcripts (i.e. transcripts converted to a predefined format, such as a '.csv file' form). In at least one embodiment, the transformation of the raw transcripts also includes performing at least one pre-processing operation on each of the raw transcripts. The pre-processing operations performed on the transcripts converted into consumable form is explained with reference to FIG. 4B.

Referring now to FIG. 4B, a block diagram 450 is shown for illustrating pre-processing operations performed on transcripts converted into consumable form, in accordance with an embodiment of the invention. The term 'pre-processing' as used herein implies processing of the transcripts to remove noise or useless information (including noisy transcripts), therefrom.

The pre-processing of the transcripts converted into the consumable form may involve performing at least one pre-processing operation selected from among operations related to stop-word removal, stemming, lemmatizing, chunking, dictionary checking, masking and rule-based transcript processing. These pre-processing operations are depicted as operations 452, 454, 456, 458, 460, 462 and 464 exemplarily depicted to be associated with text 'STOP-WORD REMOVAL', 'STEMMING', 'LEMMATIZING', 'CHUNKING', 'DICTIONARY CHECKING', 'MASKING' AND 'RULE-BASED TRANSCRIPT PROCESSING'.

The pre-processing operation of stop-word removal (i.e. operation 452) includes filtering of words like 'the', 'is', 'at', 'which', 'on', and the like, by using a list of stop words derived from various public and private libraries, such as spacy, Stanford NLP, etc.

The pre-processing operation of stemming (i.e. operation 454) involves truncating words in the transcripts to form basic word forms also referred to as stems. More specifically, the process of stemming involves removal of the ends of words and/or aggregate standard forms of same word or synonym to reduce inflectional forms for the same family of related words, or to reduce the dimensionality of textual content being processed. The stemming also reduces complexity by mapping words that refer to a same basic concept to a single root. For example, words like family, families, families', and familial may be converted to 'family'. In an embodiment, stemming may or may not include re-normalization. For example, for words like "applying", "application", "applied", non-normalized word stem may be "appl", while the re-normalized stem may be a dictionary word like "apply". The processor 202 may be configured to use stemming algorithms such as, but not limited to, Porter stemmer, Snowball stemmer, Lancaster stemmer modules and the like, for stemming the content of the transformed transcripts.

The pre-processing operation of lemmatizing (i.e. operation 456) involves obtaining a single word (base word or lemma) for a bunch of related words. The lemmatization module may use context or Part-of-Speech (PoS) tags for words for correctly normalizing words.

The pre-processing operation of chunking (i.e. operation 458) includes extracting the significant phrases (verb and noun phrases) from transcripts using PoS tagging and regular expressions (also referred to as 'regex').

The pre-processing operation of dictionary checking (i.e. operation 460) includes discarding or correcting misspelt words, proper-nouns and names. For example, words "good", "gd" or "gooood" may be corrected to "good"; words like "I'll", "ill" "I will" are normalized to "I will"; mis-spellings like "kno" and "knuw" are corrected to "know", and the like, by the processor 202. In other examples, acronyms may be normalized (for example, "NY" is normalized to "New York" or "gr8" is normalized to "great") by the processor 202.

The pre-processing operation of masking (i.e. operation 462) includes masking of confidential/numerical information (for example, credit-card details, address, phone numbers, etc.) in transcripts to facilitate formation of better clusters.

The pre-processing operation of rule-based transcript processing (i.e. operation 464) includes discarding transcripts based on predefined rules, such as a limit on a number of turns, a limit on a number of words in a turn, etc.

The final result of preprocessing of the plurality of pre-processing operations is shown as the output 406 in FIG. 4A (exemplarily depicted to be associated with text 'TRANSFORMED TRANSCRIPTS'). In effect, the transformed transcripts correspond to pre-processed transcripts, in which stop words are removed, stem words extracted and lemmatized, significant phrases chunked, spelling errors corrected or discarded, personal information masked, and irrelevant transcripts removed, thereby configuring a corpus of transformed transcripts, which are clean and ready for intent discovery and subsequent clustering of interactions based on discovered (i.e. derived) intents.

Referring now to FIG. 2, in at least one example embodiment, the processor 202 in conjunction with the instructions in the memory 204, is configured to cause the apparatus 200 to generate an interaction summary in relation to each transformed transcript. To facilitate generation of the interaction summaries, the processor 202 in conjunction with the instructions in the memory 204, is configured to cause the apparatus 200 to generate a corpus of 'n-grams' relevant to the plurality of interactions between the agents and the customers of the enterprise. It is noted that individuals words (or unigrams), bi-grams and tri-grams (for example phrases) and such sequence of words are collectively referred to as 'n-grams'. The corpus of n-grams serves as a domain vocabulary including all words, phrases, terms associated with a domain relevant to the interactions being processed for facilitating agent training. In one embodiment, the n-grams extracted from a natural language preprocessing of the raw transcripts may configure the corpus representing the domain vocabulary. For example, if the relevant domain corresponds to credit cards, then words such as 'credit card', 'bill payment', 'transaction', 'APR', 'processing fees', etc. may be extracted from NLP of the raw transcripts to configure the corpus of domain words.

Further, the domain vocabulary may be processed using a hotlist function (i.e. a function to identify key words for a particular vertical/domain) to identify vertical specific hotlist. In an embodiment, n-grams are extracted and assigned weights based on at least one predefined criterion. In one embodiment, the predefined criterion may correspond to the hot list function, or, more specifically, n-grams are extracted and assigned weights based on domain vocabulary/hot list. In another embodiment, the predefined criterion may correspond to the frequency of occurrence of the word in the transformed transcripts. In yet another embodiment, the predefined criterion may correspond to user-defined significance assigned to the words/phrases included in the domain vocabulary. The words with highest weights may be identified and used to configure an interaction summary of the transformed transcript (i.e. the summary of the corresponding conversation). As an illustrative example, consider an interaction where a customer has sought agent assistance for cancelling a reservation. The customer may have tried to cancel the reservation online but may have forgotten the password of the account and, as a result, may have failed in cancelling the reservation. As explained above, n-grams may be extracted from the transformed transcript, weights assigned to the n-grams and n-grams with highest weights used to generate the interaction summary. An example interaction summary generated in relation to the transformed transcript for the interaction explained above may be 'Forgot Password. Cancel Reservation'. It is noted that the example interaction summary as mentioned herein is for illustration purposes only and should not be considered limiting the scope of the invention. It is noted that the generation of the interaction summary is completely unsupervised and as such does not involve any manual review of individual transcripts to generate the same.

In at least one example embodiment, the processor 202 in conjunction with the instructions in the memory 204, is configured to cause the apparatus 200 to derive a plurality of intent-based interaction clusters using the interaction summary generated in relation to each transformed transcript. In one embodiment, to derive the plurality of intent-based interaction clusters, the processor 202 is configured to determine a number (or in other word, an ideal number) of clusters to facilitate automatic intent discovery/derivation. It is noted that the intent derivation as described herein is performed in an unsupervised manner as opposed to conventional intent discovery mechanisms, which use supervised learning methods involving tagging of content and feature/parameter derivation to predict customer intents. More specifically, the processor 202 is configured to derive the plurality of intent-based interaction clusters by performing unsupervised clustering of interaction summaries generated corresponding to the transformed transcripts. In an illustrative example, logic/instructions related to A-means' clustering algorithm stored in the memory 204 (shown in FIG. 2) is used to derive a number of clusters before using 'K means' clustering for clustering of interactions to configure the plurality of intent-based interaction clusters. In one example implementation, the X-means clustering algorithm is initiated with one big cluster of interaction summaries and the cluster is repeatedly divided into sub-clusters. At each cluster configuration, values related to Bayesian Information Criterion (BIC) and Akaike Information Criterion (AIC) are stored. The cluster configuration with the lowest BIC/AIC value is then chosen for further processing (i.e. further sub-division) till a predefined threshold (for example, a limit on a number of interaction summaries per cluster or a maximum number of intent-based interaction clusters) is reached. The most relevant interaction summary for each intent-based interaction cluster is chosen as the customer intent for the respective intent-based interaction cluster. As such, each intent-based interaction cluster is associated with a customer intent to configure a plurality of customer intents corresponding to the plurality of intent-based interaction clusters. An example representation of the plurality of intent-based interaction clusters with the corresponding customer intent is shown in FIG. 5.

Figure 5:
FIG. 5 is a block diagram representation displaying a plurality of intent-based interaction clusters with corresponding customer intent, in accordance with an embodiment of the invention.

Referring now to FIG. 5, a block diagram representation 500 displaying a plurality of intent-based interaction clusters with corresponding customer intent is shown, in accordance with an embodiment of the invention. The block diagram representation 500 is exemplarily depicted to be a grid-like structure including a plurality of blocks. Each block in the block diagram representation 500 corresponds to a unique customer intent. It is noted that ten clusters with each cluster associated with a unique customer intent (exemplarily labeled as Intent 1 to Intent 10) is depicted herein for illustration purposes. Some examples of customer intent in the telecommunication domain may include intents such as 'change of subscription', 'plan renewal', 'password reset' and the like.

A position of a block in the grid and a size of the block may be indicative of the relevance of the respective customer intent. For example, the Intent 7 is at the first position in the grid and associated with the largest block size, thereby indicating that the Intent 7 is most common customer intention for seeking interaction with the agent.

In some embodiments, the processor 202 may also be configured to perform a hierarchical clustering of intents, thereby classifying the intents as a top-level intent, a first level intent, a second level intent and so on and so forth. In an illustrative example, a top-level intent in a hierarchical cluster may be 'subscription', a first-level intent may be 'account changes', a second-level intent may be 'change/renew/cancel subscription' and so on and so forth. Accordingly, the interactions may be classified based on such a hierarchical clustering scheme.

Furthermore, as some interactions may involve more than one customer intent, the processor 202 may be configured to discover multiple dimensions of intentions, where one dimension corresponds to a hierarchical clustering of intents and another dimension corresponds to intents, which are related to each other. The intents which are highly probable to be encountered together in a single turn-based conversation are referred to as 'related intents'. In an illustrative example, a customer desirous of renewing a subscription online may face a 'login issue' and as such 'subscription renewal' and 'login issue' may be identified as related intents.

It is noted that a representation, such as the block diagram representation 500, may be automatically generated by the processor 202 from processing of the transformed transcripts. The automatic discovery and clustering of intents precludes cumbersome manual effort in sifting through a plurality of interactions to identify customer intentions therefrom. Further, such a display of derived intents may enable the user(s) of the apparatus 200 to take appropriate measures for provisioning desired and timely assistance to the customers.

In at least one example embodiment, the processor 202 in conjunction with the instructions in the memory 204, is configured to cause the apparatus 200 to classify interactions from among the plurality of interactions based on the plurality of intent-based interaction clusters. More specifically, the transformed transcripts corresponding to each interaction from among the plurality of interactions selected for processing may be categorized into the intent-based interaction clusters based on a match of the respective interaction summaries and the customer intent associated with the respective intent-based interaction clusters.

Subsequent to the classification of the interactions into the plurality of intent-based interaction clusters, in at least one example embodiment, the processor 202 in conjunction with the instructions in the memory 204, is configured to cause the apparatus 200 to generate an interaction flow map for each intent-based interaction cluster. The interaction flow map is generated for each intent-based interaction cluster based on the interactions classified into the respective intent-based interaction cluster. It is noted that the interaction flow map is automatically generated by the processor 202 by using logic stored in the memory 204. More specifically, the processor 202 may use logic/instructions stored in the memory 204 to trace a sequential flow of turns in each interaction classified in an intent-based cluster to generate the interaction flow map. The generated interaction flow map is capable of facilitating training of at least one agent for interacting with the customers of the enterprise. An example interaction flow map generation process is explained hereinafter.

In one embodiment, for each intent-based interaction cluster, the processor 202 is configured to retrieve all the agent utterances from the interactions classified into the respective intent-based interaction cluster. For example, if 100 interactions are classified into an intent-based interaction cluster, say Cluster 1, then all agent utterances (i.e. transcripts of agent's conversational lines) in each of the 100 interactions are extracted. Further, the processor 202 is configured to perform clustering of the agent utterances at each agent turn to generate one or more agent utterance clusters for each agent turn. For example, if there are 100 agent utterances in the first agent turn (i.e. 100 conversational lines or one agent conversational line from each of the 100 interactions classified in the Cluster 1), 70 agent utterances in the subsequent agent turn and so on and so forth, then these utterances may be processed using a clustering algorithm to generate agent utterance clusters. For example, a distance metric or any such similarity/dissimilarity metric may be used to find similarity among the agent utterances at each turn to generate agent utterance clusters for the corresponding agent turn. In an illustrative example, the processor 202 may generate five agent utterance clusters from 100 agent utterances in the first agent turn.

Similarly, for each intent-based interaction cluster, the processor 202 is configured retrieve customer utterances from the interactions classified into the intent-based interaction cluster. The processor 202, thereafter performs clustering of the customer utterances at each customer turn to generate one or more customer utterance clusters for each customer turn.

To summarize, for an intent-based interaction cluster say Cluster 1, the processor 202 generates agent utterance clusters for each agent turn and customer utterance clusters for each customer turn. Thereafter, the processor 202 is configured to trace the flow of interaction (i.e. logical sequence of utterances) from one interaction turn to another interaction turn using interaction paths, where each interaction path connects an utterance cluster at one turn to another utterance cluster at a subsequent turn. More specifically, for an agent turn, an utterance cluster is selected from among the one or more agent utterance clusters corresponding to the respective agent turn. An interaction path connects the selected agent utterance cluster with a customer utterance cluster selected from among one or more customer utterance clusters corresponding to the respective customer turn (i.e. previous or subsequent turn to the agent turn). Similarly, for a customer turn, an utterance cluster is selected from among the one or more customer utterance clusters corresponding to the respective customer turn. The interaction path connects the selected customer utterance cluster with an agent utterance cluster selected from among one or more agent utterance clusters corresponding to the respective agent turn (i.e. previous or subsequent turn to the customer turn).

It is noted that such tracing is performed for each interaction classified into the respective intent-based interaction cluster. Further, in some embodiments, each interaction path is associated with a count of a number of interactions following the flow of interaction between utterance clusters as represented by the respective interaction path. The generation of agent utterance clusters, customer utterance clusters and the interaction paths interconnecting them is exemplarily depicted in FIG. 6.

Figure 6:
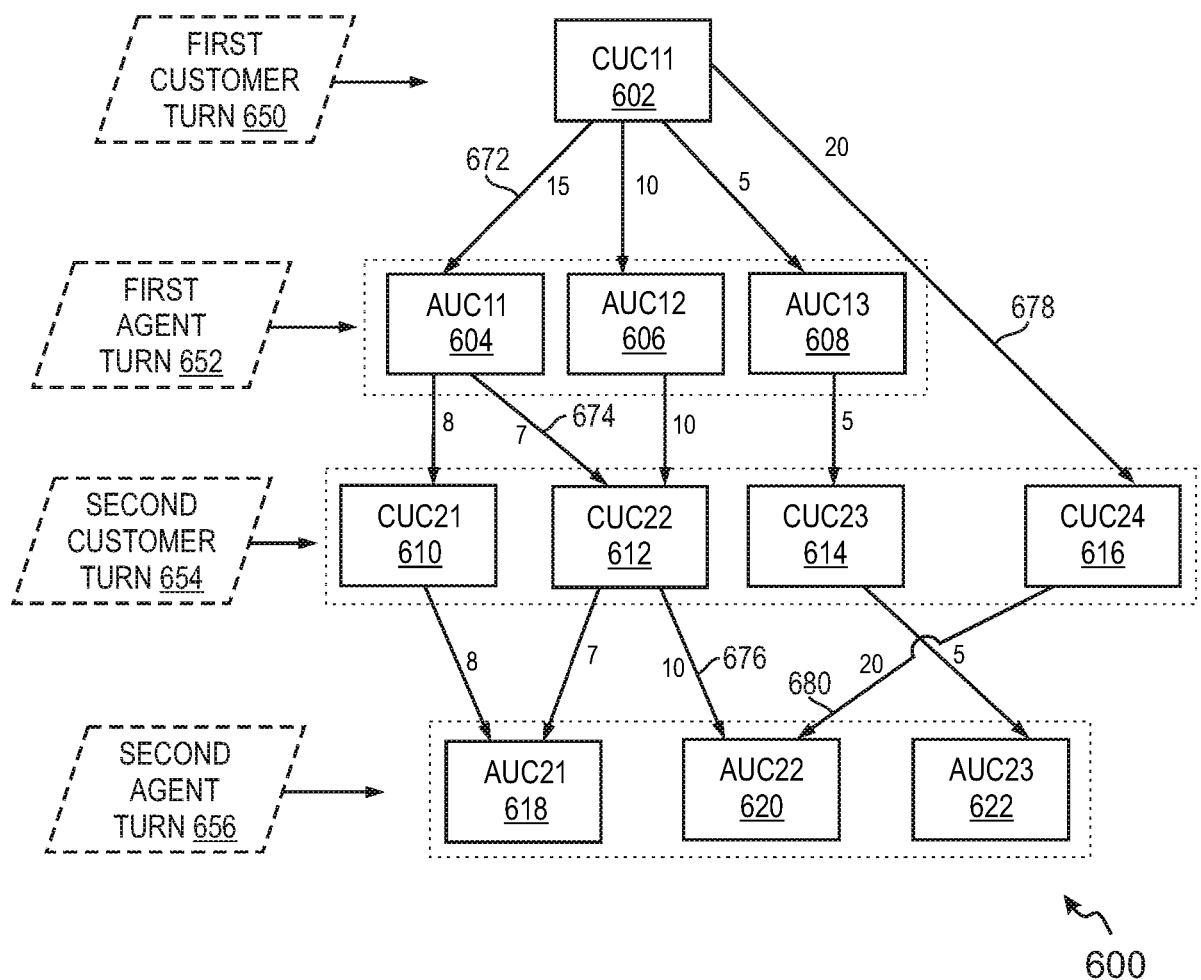
FIG. 6 shows a representation for illustrating generation of an interaction flow map, in accordance with an embodiment of the invention.

Referring now to FIG. 6, a representation 600 is shown for illustrating generation of an interaction flow map, in accordance with an embodiment of the invention. As explained with reference from FIGS. 2 to 5, the plurality of interactions between agents and the customers of the enterprise are classified into a plurality of intent-based interaction clusters. The processor 202 is further configured to generate an interaction flow map for each intent-based interaction cluster using the interactions classified into the respective intent-based interaction cluster. The representation 600 shown in FIG. 6 corresponds to a portion of an interaction flow map generated for a single intent-based interaction cluster. Further, as explained with reference to FIG. 5, all agent and customer utterances in the interactions classified into the intent-based interaction cluster are retrieved and clustered turn by turn to configure agent utterance clusters at agent turns and customer utterance clusters at customer turns. Accordingly, the representation 600 shows a single customer utterance cluster (CUC) 602 (shown to be associated with text 'CUC11 602' representing a first customer utterance cluster for a first customer turn 650). It is noted that a single customer utterance cluster is shown for the first customer turn 650 as in most cases the customers may initiate interactions with agents in a fairly standard manner, for example with a 'Hi' or 'Hello'. As such, different ways to initiate the interaction may show minor variations and hence the single cluster may be formed to represent all customer utterances at the first customer turn 650.

Further, as explained with a reference to FIGS. 1 and 2, the customers and agents take turns in interacting with each other in a turn-based interaction. Accordingly, the first customer turn 650 may be followed by a first agent turn 652. All agent utterances corresponding to the first agent turn across all interactions in the intent-based interaction cluster may be retrieved and clustered to configure three agent utterance clusters, shown as agent utterance clusters 604, 606 and 608. These clusters are depicted to be associated with text AUC11 604, AUC12 606 and AUC13 608 representing a first agent utterance cluster, a second agent utterance cluster and a third agent utterance cluster for the first agent turn 652, respectively.

The first agent turn 652 is followed by a second customer turn 654 and all customer utterances corresponding to the second customer turn across all interactions in the intent-based interaction cluster may be retrieved and clustered to configure four customer utterance clusters 610, 612, 614 and 616. These clusters are depicted to be associated with text CUC21 610, CUC22 612, CUC23 614 and CUC24 616 representing a first customer utterance cluster, a second customer utterance cluster, a third customer utterance cluster and a fourth customer utterance cluster for the second customer turn 654, respectively.

The second customer turn 654 is followed by a second agent turn 656 and all agent utterances corresponding to the second agent turn across all interactions in the intent-based interaction cluster may be retrieved and clustered to configure three agent utterance clusters 618, 620 and 622. These clusters are depicted to be associated with text AUC21 618, AUC22 620 and AUC23 622 representing a first agent utterance cluster, a second agent utterance cluster and a third agent utterance cluster for the second agent turn 656, respectively.

For each interaction, an interaction path is traced from one interaction turn to another. For example, a first interaction may trace an interaction path 672 from CUC11 602 to AUC11 604, an interaction path 674 from AUC11 604 to CUC22 612 and an interaction path 676 from CUC22 612 to AUC22 620. Another interaction, say a second interaction, may trace an interaction path 678 from CUC11 602 to CUC24 616 and an interaction path 680 from CUC24 616 to AUC22 620. Similarly, the flow of interaction may be traced for all interactions classified within the intent-based interaction cluster to generate the interaction flow map for the respective intent-based interaction cluster.

As can be observed, each interaction path is associated with a count of a number of interactions following the flow of interaction between utterance clusters as represented by the respective interaction path. For example, the interaction path 674 is associated with a count 7 indicating seven interactions associated with the transition from AUC11 604 to CUC22 612. Such an automatically generated interaction flow map serves as a reference for a solution designer while designing a chatbot for interacting with the customers on concerns related to similar intent. A simplified representation of a portion of an example interaction flow map generated by the processor 202 is shown in FIG. 7.

Figure 7:
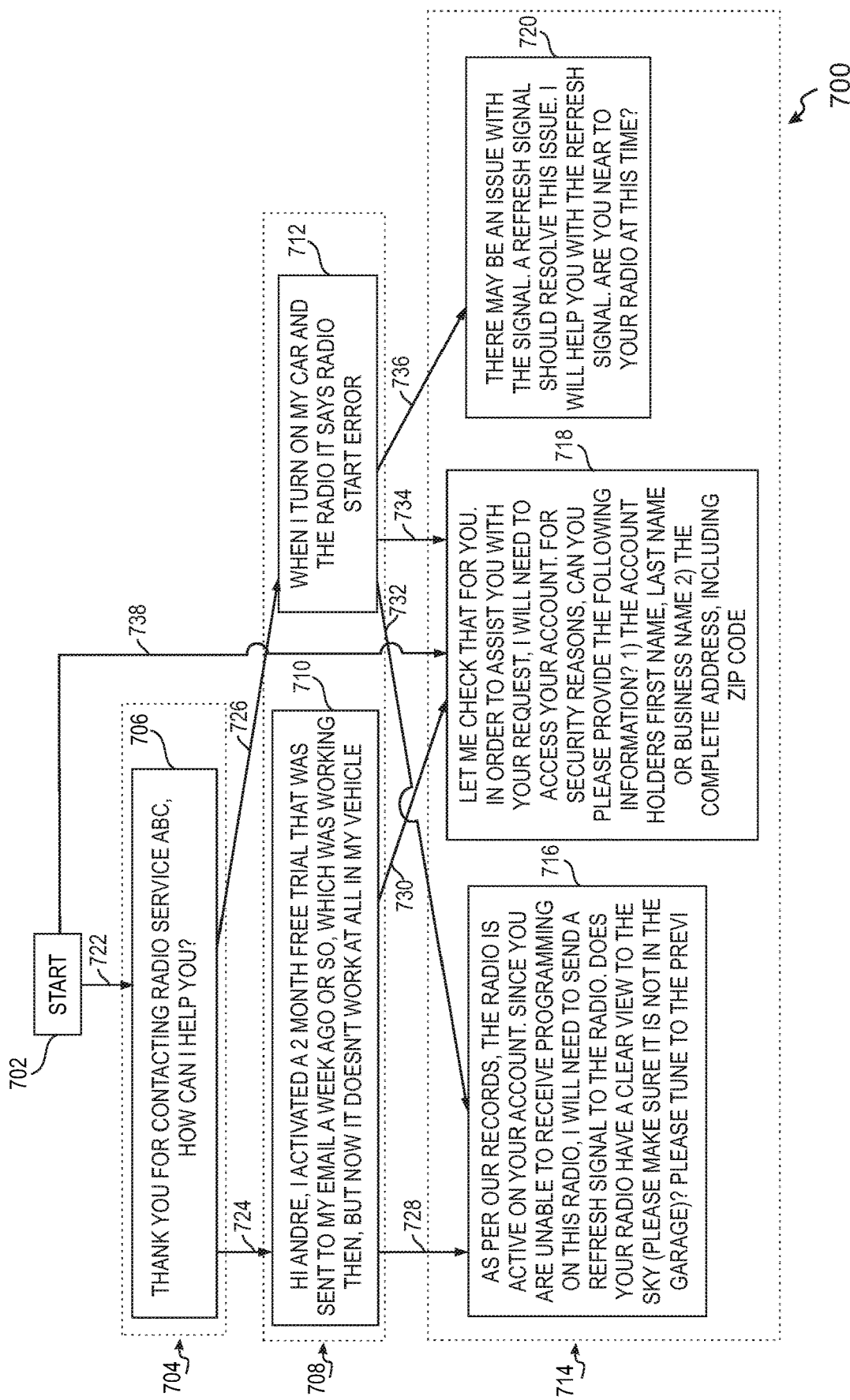
FIG. 7 shows a simplified representation of a portion of an example interaction flow map generated by the processor of FIG. 2, in accordance with an embodiment of the invention.

FIG. 7 shows a simplified representation of a portion of an example interaction flow map 700 generated by the processor 202 (shown in FIG. 2), in accordance with an embodiment of the invention. As explained with reference to FIGS. 5 and 6, an interaction flow map is generated for each intent-based interaction cluster. The generation of the interaction flow map, such as the interaction flow map 700 shown in FIG. 7, involves retrieving all agent utterances and customer utterances from the interactions classified into the intent-based interaction cluster. The retrieved agent utterances and the customer utterances are then subjected to clustering at a turn-level so as to configure one or more agent utterance clusters at each agent turn and one or more customer utterance clusters at each customer turn. The flow of interaction from one interaction turn to another is then traced using interaction paths as explained with reference to FIG. 6 to configure the interaction flow map, such as the interaction flow map 700.

The interaction flow map 700 depicted in FIG. 7 is generated for an intent-based interaction cluster associated with a customer intent related to issues with working of the car radio. It is noted that a simplified version of a portion of the interaction flow map 700 generated by the processor 202 is shown for illustration purposes only. It is noted that the interaction flow map 700 may not be limited to a two agent turns and a single customer turn as depicted herein. It is noted that the interaction flow map 700 may include several customer and agent turns. Moreover, a number of utterance clusters at each customer and agent turn may also vary and may not be limited to the number depicted in FIG. 7.

As can be seen, the interaction flow map 700 starts at 702, which corresponds to initiation of the interaction either by the agent or the customer. The subsequent agent turn 704 is depicted to be associated with a single agent utterance cluster 706. The agent turn 704 is followed by a customer turn 708, which is associated with two customer utterance clusters 710 and 712. The customer turn 708 is followed by the agent turn 714, which is associated with three agent utterance clusters 716, 718 and 720. A transcript of the summarized (or best) utterance for a given cluster is depicted to be included within the respective utterance cluster. Further, interaction paths, such as interaction paths 722, 724, 726, 728, 730, 732, 734, 736, 738 and 740 trace the flow of interaction for interactions classified into the intent-based interaction cluster represented by the interaction flow map 700. Further, each interaction path is associated with a count of number of interactions following the respective interaction path.

As explained with reference to FIG. 6, such interaction flow maps may be used to train agents. For example, solution designers may use the interaction flow maps as a reference map to train machine learning algorithms to function as automated conversational agents or chat bots. Further, the solution designers may also make changes to interaction flow maps, such as for example add or remove a cluster or an interaction path to customize the interaction flow map as per the design needs. For example, the solution designer or the flow designer may add a node corresponding to an utterance 'Congratulations on your new vehicle!' which may not be present previously. Such an utterance may help humanize a conversation of a chat bot and provide a better experience than providing machine responses to a customer. In some embodiments, instead of the interaction paths being associated with the counts of the number of interactions following the respective interaction paths, the interaction paths may be associated with probability scores indicating a probability score of one utterance cluster at an interaction turn flowing into another utterance cluster at a subsequent interaction turn. The bots trained using such conversational flow maps may be deployed for customer engagement without any further need to retrain the bot.

Figure 8:
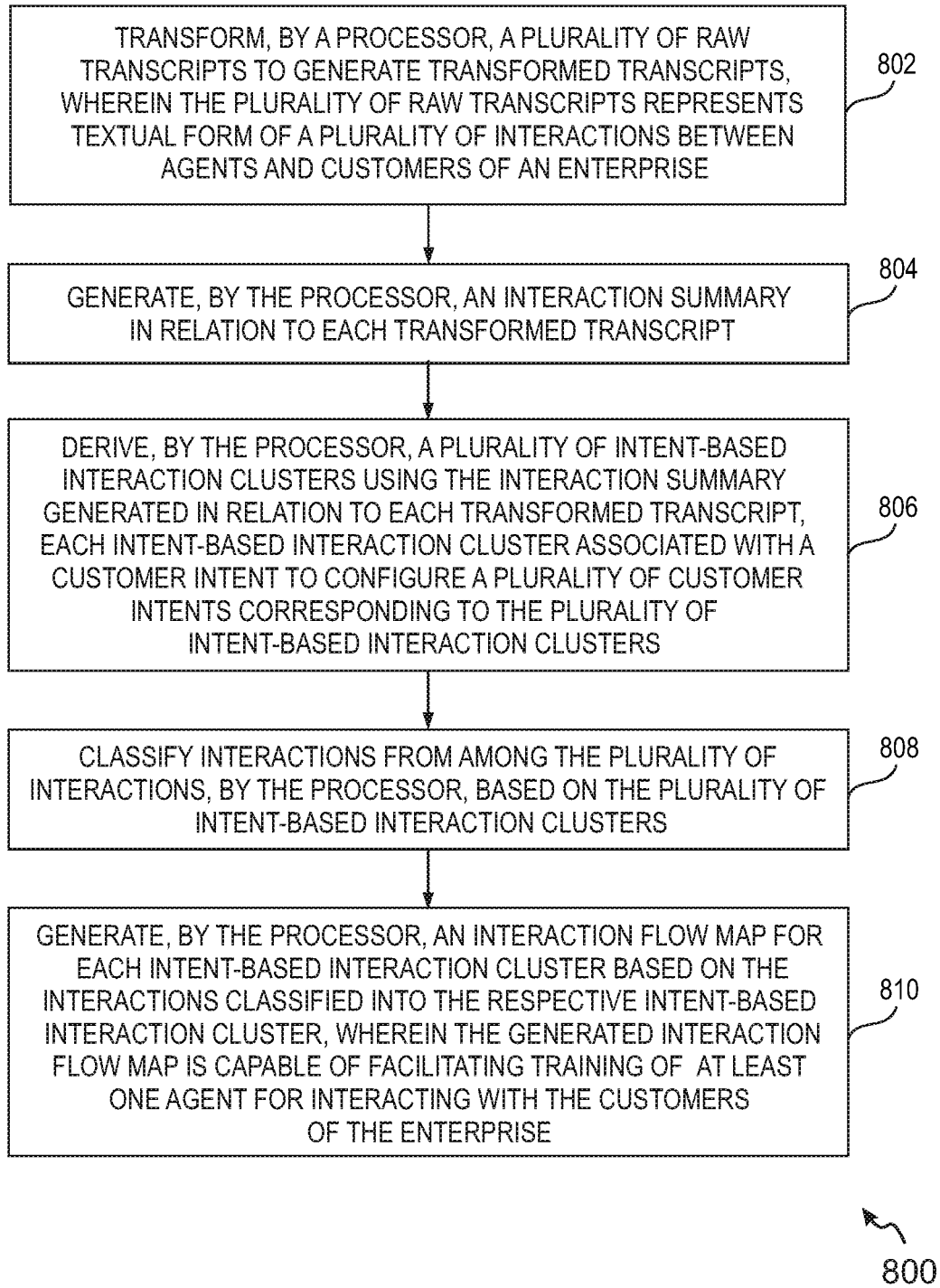
FIG. 8 shows a flow diagram of a method for facilitating training of agents of an enterprise, in accordance with an embodiment of the invention.

FIG. 8 shows a flow diagram of a method 800 for facilitating training of agents of an enterprise, in accordance with an embodiment of the invention. The method 800 depicted in the flow diagram may be executed by, for example, the apparatus 200 explained with reference to FIGS. 2 to 7. Operations of the flowchart, and combinations of operation in the flowchart, may be implemented by, for example, hardware, firmware, a processor, circuitry and/or a different device associated with the execution of software that includes one or more computer program instructions. The operations of the method 800 are described herein with help of the apparatus 200. It is noted that, the operations of the method 800 can be described and/or practiced by using any system other than the apparatus 200. The method 800 starts at operation 802.

At operation 802 of the method 800, a plurality of raw transcripts are transformed by a processor, such as the processor 202 of FIG. 2, to generate transformed transcripts. It is noted that the plurality of raw transcripts represents textual form of a plurality of interactions between the agents and customers of the enterprise. The plurality of interactions include voice interactions and textual chat interactions between the agents and the customers of the enterprise. The processor is configured to generate textual representations of the voice interactions using natural language processing (NLP) and automatic speech recognition (ASR). More specifically, the processor is configured to convert the non-textual conversations into a textual form using NLP and ASR with special grammar. The chat interactions, which are already in textual form, as well as the textual representations of voice interactions (i.e. transcripts of voice interactions) together configure a corpus of raw transcripts, also referred to herein as a plurality of raw transcripts. The transformation of the transcripts involves conversion of the raw transcripts to a predefined format, such as for example, into a comma separated value (.csv) file format. The transformed csv file may include a chat id (or a conversation id), a turn sequence (i.e. a sequence number of the turn), a turn from (i.e. binary representation indicative of whether the turn is from user or agent) and a body (i.e. text uttered by customer/agent in each turn). All the turns are grouped and sorted based on chat id.

In at least one embodiment, the transformation of the raw transcripts also includes performing at least one pre-processing operation on each of the raw transcripts. The pre-processing operations are performed on the transcripts converted into consumable form (i.e. the predefined format). The pre-processing of the transcripts converted into consumable form may involve at least one pre-processing operation selected from among operations related to stop-word removal, stemming, lemmatization, chunking, dictionary checking, masking and rule-based transcript processing. The pre-processing operations are explained with reference to FIG. 4B and are not explained again herein. In effect, the transformed transcripts correspond to pre-processed transcripts, in which stop words are removed, stem words extracted and lemmatized, significant phrases chunked, spelling errors corrected or discarded, personal information masked, and irrelevant transcripts removed, thereby configuring a corpus of transformed transcripts, which are clean and ready for intent discovery and subsequent clustering of interactions based on discovered (i.e. derived) intents.

At operation 804 of the method 800, an interaction summary is generated by the processor in relation to each transformed transcript. To facilitate generation of the interaction summaries, the processor is configured to generate a corpus of 'n-grams' relevant to the plurality of interactions between the agents and the customers of the enterprise. It is noted that individuals words (or unigrams), bi-grams and tri-grams (for example phrases) and such sequence of words are collectively referred to as 'n-grams'. The corpus of n-grams serves as a domain vocabulary including all words, phrases, terms associated with a domain relevant to the interactions being processed for facilitating agent training.

In one embodiment, the n-grams extracted from a natural language preprocessing of the raw transcripts may configure the corpus representing the domain vocabulary. For example, if the relevant domain corresponds to credit cards, then words such as 'credit card', 'bill payment', 'transaction', 'APR', 'processing fees', etc. may be extracted from NLP of the raw transcripts to configure the corpus of domain words. Further, the domain vocabulary may be processed using a hotlist function (i.e. a function to identify key words for a particular vertical/domain) to identify vertical specific hotlist. In an embodiment, n-grams are extracted and assigned weights based on at least one predefined criterion. In one embodiment, the predefined criterion may correspond to the hot list function, or, more specifically, n-grams are extracted and assigned weights based on domain vocabulary/hot list. In another embodiment, the predefined criterion may correspond to the frequency of occurrence of the word in the transformed transcripts. In yet another embodiment, the predefined criterion may correspond to user-defined significance assigned to the words/phrases included in the domain vocabulary. The words with highest weights are identified and used to configure an interaction summary of the transformed transcript (i.e. the summary of the corresponding conversation).

At operation 806 of the method 800, a plurality of intent-based interaction clusters are derived by the processor using the interaction summary generated in relation to each transformed transcript. The processor is configured to derive the plurality of intent-based interaction clusters by performing unsupervised clustering of interaction summaries generated corresponding to the transformed transcripts. In an illustrative example, logic/instructions related to 'A-means' clustering algorithm stored in the memory is used to derive a number of clusters before using 'K means' clustering for clustering of interactions to configure the plurality of intent-based interaction clusters. In one example implementation, the X-means clustering algorithm is initiated with one big cluster of interaction summaries and the cluster is repeatedly divided into sub-clusters. At each cluster configuration, values related to Bayesian Information Criterion (BIC) and Akaike Information Criterion (AIC) are stored. The cluster configuration with the lowest BIC/AIC value is then chosen for further processing (i.e. further sub-division) till a pre-defined threshold (for example, a limit on a number of interaction summaries per cluster or a maximum number of intent-based interaction clusters) is reached. The most relevant interaction summary for each intent-based interaction cluster is chosen as the customer intent for the respective intent-based interaction cluster. As such, each intent-based interaction cluster is associated with a customer intent to configure a plurality of customer intents corresponding to the plurality of intent-based interaction clusters.

At operation 808 of the method 800, interactions from among the plurality of interactions are classified, by the processor, based on the plurality of intent-based interaction clusters. More specifically, the transformed transcripts corresponding to each interaction from among the plurality of interactions selected for processing may be categorized into the intent-based interaction clusters based on a match of the respective interaction summaries and the customer intent associated with the respective intent-based interaction clusters.

At operation 810 of the method 800, an interaction flow map is generated by the processor for each intent-based interaction cluster based on the interactions classified into the respective intent-based interaction cluster. The generated interaction flow map is capable of facilitating training of at least one agent for interacting with the customers of the enterprise.

In one embodiment, for each intent-based interaction cluster, the processor is configured to retrieve all the agent utterances from the interactions classified into the respective intent-based interaction cluster. Further, the processor is configured to perform clustering of the agent utterances at each agent turn to generate one or more agent utterance clusters for each agent turn. For example, a distance metric or any such similarity/dissimilarity metric may be used to find similarity among the agent utterances to generate agent utterance clusters. Similarly, for each intent-based interaction cluster, the processor is configured retrieve customer utterances from the interactions classified into the intent-based interaction cluster. The processor thereafter performs clustering of the customer utterances at each customer turn to generate one or more customer utterance clusters for each customer turn. To summarize, for an intent-based interaction cluster say Cluster 1, the processor generates agent utterance clusters for each agent turn and customer utterance clusters for each customer turn. Thereafter, the processor is configured to trace the flow of interaction (i.e. logical sequence of utterances) from one interaction turn to another using interaction paths, where each interaction path connects an utterance cluster at one turn to another utterance cluster at a subsequent turn. More specifically, for an agent turn, an utterance cluster is selected from among the one or more agent utterance clusters corresponding to the respective agent turn. An interaction path connects the selected agent utterance cluster with a customer utterance cluster selected from among one or more customer utterance clusters corresponding to the respective customer turn (i.e. previous or subsequent turn to the agent turn). Similarly, for a customer turn, an utterance cluster is selected from among the one or more customer utterance clusters corresponding to the respective customer turn. The interaction path connects the selected customer utterance cluster with an agent utterance cluster selected from among one or more agent utterance clusters corresponding to the respective agent turn (i.e. previous or subsequent turn to the customer turn).

It is noted that such tracing is performed for each interaction classified into the respective intent-based interaction cluster. Further, in some embodiments, each interaction path is associated with a count of a number of interactions following the flow of interaction between utterance clusters as represented by the respective interaction path. The tracing of the interaction flow results in the generation of the interaction flow map. The generation of the interaction flow map is explained with reference to FIGS. 6 and 7. The method 800 ends at operation 810.

Figure 9:
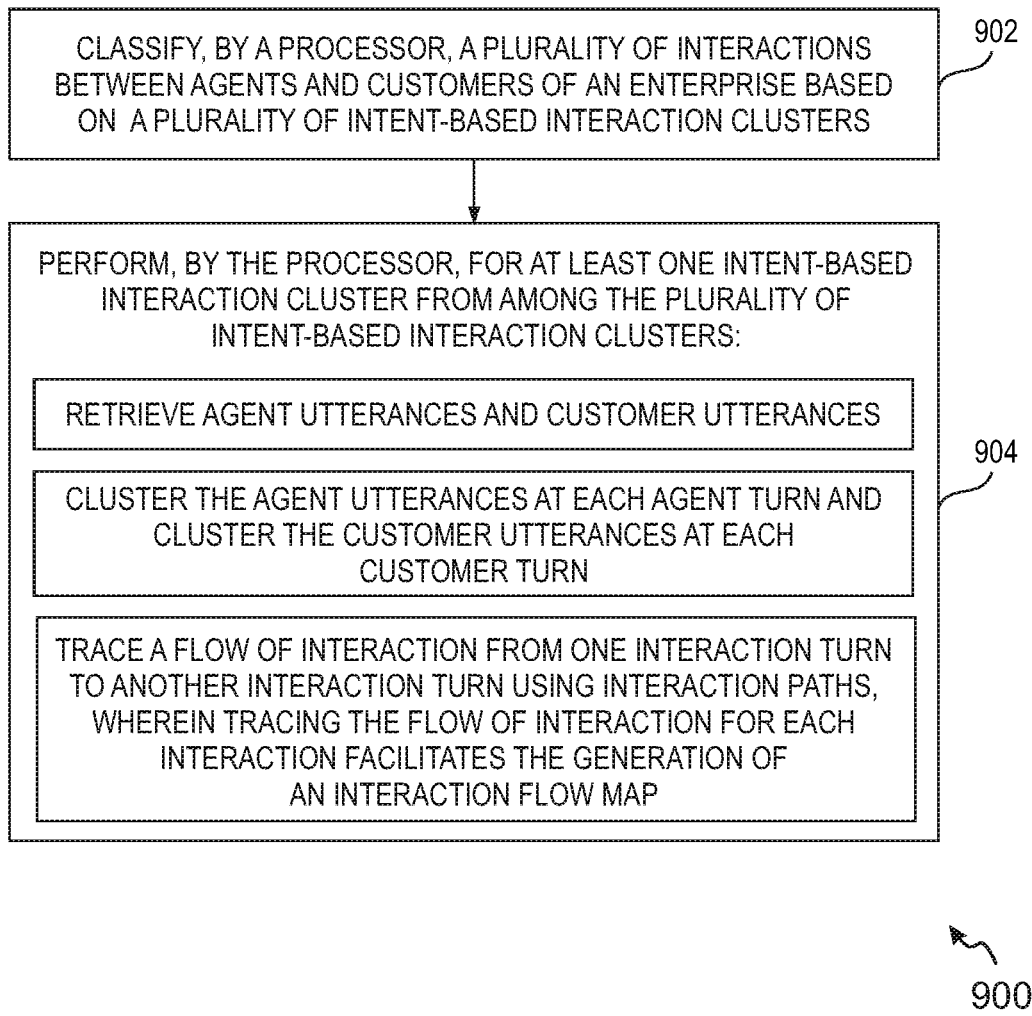
FIG. 9 shows a flow diagram of a method for facilitating training of chatbots of an enterprise, in accordance with an embodiment of the invention.

FIG. 9 shows a flow diagram of a method 900 for facilitating training of agents, in accordance with another embodiment of the invention. The various steps and/or operations of the flow diagram, and combinations of steps/operations in the flow diagram, may be implemented by, for example, hardware, firmware, a processor, circuitry and/or by an apparatus such as the apparatus 200 of FIG. 2 and/or by a different device associated with the execution of software that includes one or more computer program instructions. The method 900 starts at operation 902.

At operation 902 of the method 900, a plurality of interactions between the agents and customers of the enterprise are classified based by a processor, such as the processor 202 of FIG. 2, based on a plurality of customer intents to configure a plurality of intent-based interaction clusters. The classification of the interactions may be performed as explained with reference to operation 808 of the method 800 of FIG. 8 and is not explained again herein.

At operation 904 of the method 900, for at least one intent-based interaction cluster from among the plurality of intent-based interaction clusters, the following steps are performed: (1) retrieve agent utterances and customer utterances from the interactions classified into the intent-based interaction cluster; (2) cluster the agent utterances at each agent turn and cluster the customer utterances at each customer turn to generate one or more agent utterance clusters for each agent turn and one or more customer utterance clusters for each customer turn, respectively; and (3) trace the flow of interaction from one interaction turn to another using interaction paths for each interaction classified into the intent-based interaction cluster. It is noted that each interaction path is capable of connecting an utterance cluster at one turn to another utterance cluster at a subsequent turn. The tracing of the flow of interaction for each interaction facilitates the generation of an interaction flow map for the respective intent-based interaction cluster and the interaction flow map is capable of facilitating training of at least one agent, such as a chatbot, for interacting with the customers of the enterprise. The generation of the interaction flow map is explained with reference to FIGS. 6 and 7 and is not explained again herein.

Various embodiments disclosed herein provide numerous advantages. The techniques disclosed herein suggest techniques for generating interaction flow maps for facilitating training of agents of the enterprise. The interaction flow maps are generated in an automated manner, thereby precluding slow and cumbersome manual mapping of conversational flows. As the interaction flows are mapped by processing a plurality of conversational transcripts, the maps of the conversational flows are fairly comprehensive and accurate, and as such, the bots trained using such conversational flow maps may be deployed immediately after the model training is completed, thereby expediting the deployment of bots.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200 and its various components such as the processor 202, the memory 204, the I/O module 206, the communication module 208, the centralized circuit system 210 and the database 250 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 8 and 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for facilitating training of agents of an enterprise, the method comprising:

transforming, by a processor, a plurality of raw transcripts to generate transformed transcripts, wherein the plurality of raw transcripts represents a textual form of a plurality of interactions between the agents and customers of the enterprise, and wherein transforming each raw transcript from among the plurality of raw transcripts comprises performing at least one pre-processing operation on the respective raw transcript;

generating, by the processor, an interaction summary in relation to each transformed transcript;

deriving, by the processor, a plurality of intent-based interaction clusters using the interaction summary generated in relation to each transformed transcript;

associating each intent-based interaction cluster with a customer intent to configure a plurality of customer intents corresponding to the plurality of intent-based interaction clusters;

classifying interactions from among the plurality of interactions, by the processor, based on the plurality of intent-based interaction clusters;

retrieving agent utterances and customer utterances from the interactions classified into the intent-based interaction clusters;

clustering the agent utterances at each agent turn and clustering the customer utterances ate each customer turn to generate one or more agent utterance clusters for each agent turn and one or more customer utterance clusters for each customer turn, respectively;

tracing a flow of interaction from one interaction turn to another interaction turn using interaction paths for each interaction classified into the intent-based interaction clusters;

for each interaction path, connecting an utterance cluster at one turn to another utterance cluster at a subsequent turn;

tracing the flow of interaction for each interaction to facilitate the generation of an interaction flow map for the respective intent-based interaction cluster; and using the generated interaction flow map to facilitate training of at least one chatbot for interacting with the customers of the enterprise.

2. The method of claim 1, further comprising:

for an agent turn, selecting the utterance cluster from among the one or more agent utterance clusters corresponding to the respective agent turn; and for the subsequent turn being a customer turn, selecting the another utterance cluster from among the one or more customer utterance clusters corresponding to the respective customer turn.

3. The method of claim 1, further comprising:

for a customer turn, selecting the utterance cluster from among the one or more customer utterance clusters corresponding to the respective customer turn; and for the subsequent turn being an agent turn, selecting the another utterance cluster from among the one or more agent utterance clusters corresponding to the respective customer turn.

4. The method of claim 1, further comprising:

associating each interaction path with a count of a number of interactions following the flow of interaction between utterance clusters as represented by the respective interaction path.

5. The method of claim 1, further comprising:

generating, by the processor, a corpus of n-grams relevant to the plurality of interactions between the agents and the customers of the enterprise; and associating, by the processor, each n-gram with a weight based on at least one predefined criterion, wherein the interaction summary is generated for each transformed transcript based, at least in part, on the weight associated with each n-gram.

6. The method of claim 1, wherein deriving the plurality of intent-based interaction clusters comprises performing unsupervised clustering of interaction summaries generated corresponding to the transformed transcripts.

7. The method of claim 1, further comprising:

selecting the at least one pre-processing operation from among operations related to stop-word removal, stemming, lemmatization, chunking, dictionary checking, masking and rule-based transcript processing.

8. The method of claim 1, wherein the plurality of interactions comprises voice interactions and textual chat interactions between the agents and the customers of the enterprise.

9. The method of claim 8, further comprising:

generating, by the processor, textual representations of the voice interactions using at least one processing technique from among Natural Language Processing (NLP) and Automatic Speech Recognition (ASR).

10. The method of claim 9, further comprising:

converting each textual chat interaction and each textual representation of the voice interaction into a predefined format to generate the transformed transcripts.

11. An apparatus for facilitating training of agents of an enterprise, the apparatus comprising:

a memory for storing instructions; and a processor configured to execute the instructions and thereby cause the apparatus to at least perform:

transform a plurality of raw transcripts to generate transformed transcripts, wherein the plurality of raw transcripts represents textual form of a plurality of interactions between the agents and customers of the enterprise and, wherein transforming each raw transcript from among the plurality of raw transcripts comprises performing at least one pre-processing operation on the respective raw transcript;

generate an interaction summary in relation to each transformed transcript;

derive a plurality of intent-based interaction clusters using the interaction summary generated in relation to each transformed transcript;

associate each intent-based interaction cluster with a customer intent to configure a plurality of customer intents corresponding to the plurality of intent-based interaction clusters;
classify interactions from among the plurality of interactions based on the plurality of intent-based interaction clusters;
retrieve agent utterances and customer utterances from interactions classified into the intent-based interaction cluster;
cluster the agent utterances at each agent turn and cluster the customer utterances at each customer turn to generate one or more agent utterance clusters for each agent turn and one or more customer utterance clusters for each customer turn, respectively;
trace a flow of interaction from one interaction turn to another interaction turn using interaction paths for each interaction classified into the intent-based interaction cluster;
for each interaction path, connect an utterance cluster at one turn to another utterance cluster at a subsequent turn;
trace the flow of interaction for each interaction to facilitate the generation of an interaction flow map for the respective intent-based interaction cluster; and
with the generated interaction flow map, facilitate training of at least one agent for interacting with the customers of the enterprise.

12. The apparatus of claim 11, wherein deriving the plurality of intent-based interaction clusters comprises performing unsupervised clustering of interaction summaries generated corresponding to the transformed transcripts.

13. The apparatus of claim 11, wherein the apparatus is further caused to:
generate a corpus of n-grams relevant to the plurality of interactions between the agents and the customers of the enterprise;
associate each n-gram with a weight based on at least one predefined criterion; and
generate the interaction summary for each transformed transcript based, at least in part, on the weight associated with each n-gram.

14. A computer-implemented method for facilitating training of chatbots of an enterprise, the method comprising:
classifying, by a processor, a plurality of interactions between agents and customers of the enterprise based on a plurality of intent-based interaction clusters; and
performing, by the processor, for at least one intent-based interaction cluster from among the plurality of intent-based interaction clusters:
retrieve agent utterances and customer utterances from interactions classified into the intent-based interaction cluster;
cluster the agent utterances at each agent turn and cluster the customer utterances at each customer turn to generate one or more agent utterance clusters for each agent turn and one or more customer utterance clusters for each customer turn, respectively;
trace a flow of interaction from one interaction turn to another interaction turn using interaction paths for each interaction classified into the intent-based interaction cluster;
for each interaction path, connect an utterance cluster at one turn to another utterance cluster at a subsequent turn;
trace the flow of interaction for each interaction to facilitate the generation of an interaction flow map for the respective intent-based interaction cluster; and
with the interaction flow map, facilitate training of at least one chatbot for interacting with the customers of the enterprise.

15. The method of claim 14, further comprising:
generating, by the processor, a corpus of n-grams relevant to the plurality of interactions between the agents and the customers of the enterprise;
associating, by the processor, each n-gram with a weight based on at least one predefined criterion;
generating, by the processor, an interaction summary in relation to each interaction from among the plurality of interactions; and
generating the interaction summary for each interaction based, at least in part, on the weight associated with each n-gram and, wherein the plurality of intent-based interaction clusters are derived using the interaction summary generated in relation to each interaction.

* * * * *